United States Patent [19]
Kawazoe

[11] Patent Number: 5,652,703
[45] Date of Patent: Jul. 29, 1997

[54] AUTOMATIC LEVEL CONTROLLER OF MOTOR VEHICLE

[75] Inventor: Hiroshi Kawazoe, Fujisawa, Japan

[73] Assignee: Nissan Motor Co., Ltd., Yokohama, Japan

[21] Appl. No.: 404,383

[22] Filed: Mar. 14, 1995

[30] Foreign Application Priority Data

Mar. 14, 1994 [JP] Japan .................................. 6-042198

[51] Int. Cl.$^6$ .................................................. B60G 17/015
[52] U.S. Cl. ........................ 364/424.046; 280/707; 280/840
[58] Field of Search .................. 364/424.05, 424.046, 364/424.047; 280/707, 840; 180/41

[56] References Cited

U.S. PATENT DOCUMENTS

| | | | |
|---|---|---|---|
| 4,965,878 | 10/1990 | Yamagiwa et al. | 364/424.05 |
| 5,100,167 | 3/1992 | Kamimura | 280/707 |
| 5,286,059 | 2/1994 | Tabe | 280/840 |

FOREIGN PATENT DOCUMENTS 5-77620  3/1993  Japan .

*Primary Examiner*—Michael Zanelli
*Attorney, Agent, or Firm*—Lowe, Price, LeBlanc & Becker

[57] ABSTRACT

An automatic level controller of a motor vehicle has height adjusters. Each adjuster is operatively interposed between a road wheel and a vehicle body and has a work fluid chamber communicated with a compressed fluid source. The pressure in the work fluid chamber of each height adjuster is controlled in accordance with an instruction signal applied thereto. By controlling the pressure, the level controller can create both a body lowering control mode and a body raising control mode. The height of a portion of the vehicle body, which portion is supported by selected one of the height adjusters, is detected by a height sensor. A standstill of the vehicle is detected by a sensor. A jack-up representing signal is issued when, under the body lowering control mode at the standstill of the vehicle, the height of the portion detected by the height sensor is kept increased for a given time. Upon issuance of the jack-up representing signal, the level controller is suppressed from producing the body lowering control mode.

6 Claims, 4 Drawing Sheets

5,652,703

AUTOMATIC LEVEL CONTROLLER OF MOTOR VEHICLE

BACKGROUND OF THE INVENTION

1. Field of the Invention

The present invention relates in general to automatic level controllers of a motor vehicle, and more particularly to the automatic level controllers of a type which carries out the vehicle height adjustment by using a fluid pressure, such as, air pressure and hydraulic pressure.

2. Description of the Prior Art

One of conventional automatic level controllers of a motor vehicle is described in Japanese Patent First Provisional Publication 5-77620. A control system of this level controller comprises a so-called jack-up judging means which issues a certain instruction signal when, under a vehicle body lowering control mode, the vehicle is judged to be jacked up, and a so-called jack-up promotion means which stops the vehicle body lowering control mode when receiving the certain instruction signal. That is, when the vehicle is standing with the level controller being under the body lowering control mode, the jack-up judging means carries out a judgment as to whether the vehicle is being jacked up or not by analyzing information signals issued from front and rear vehicle height sensors. More specifically, the jack-up judging means issues the instruction signal when the vehicle body is raised by a given degree from a reference level.

However, due to its inherent construction, the automatic level controller of the publication has failed to exhibit a satisfied performance.

That is, when, under the body lowering control mode at the standstill of the vehicle, the vehicle is jacked up by a suitable jack-up device 100 (see FIG. 4) and this jack-up handling is stopped before the vehicle body makes a sufficient rising from the reference level, the body lowering control mode is forced to continue. In this case, the pressurized air in air chambers of the level controller is fully discharged therefrom. Thus, when thereafter the jack-up device is handled to lower the vehicle body onto a road surface, it tends to occur that the vehicle stands on the road with its body remarkably and thus inelegantly lowered.

For ease of the following description, the handling for raising the vehicle body from a road surface by using a jack-up device will be referred to "jack-up handling", and the handling for lowering the raised vehicle body onto the road surface by using the jack-up device will be referred to "jack-down handling".

SUMMARY OF THE INVENTION

It is therefore an object of the present invention to provide an automatic level controller of a motor vehicle, which is free of the above-mentioned drawback.

That is, in accordance with the present invention, there is provided an automatic level controller of a motor vehicle, which can assuredly avoid the remarkable lowering of the vehicle body at the jack-down handling regardless of the degree of the vehicle body rising which the jack-up handling has induced.

According to the present invention, there is provided an automatic level controller of a motor vehicle, which comprises height adjusters each being operatively interposed between a road wheel and a vehicle body, each height adjuster having a work fluid chamber communicated with a compressed fluid source; first means for controlling the pressure in the work fluid chamber of each height adjuster in accordance with an instruction signal applied thereto, the first means being capable of producing both a body lowering control mode wherein the vehicle body is being lowered and a body raising control mode wherein the vehicle body is being raised; second means for detecting the height of a portion of the vehicle body which is to be adjusted in height by selected one of the height adjusters; third means for detecting a standstill of the vehicle; fourth means for determining lapse of a predetermined period of time that the height of the portion detected by the second means is kept increased and thereafter issuing a jack-up representing signal when, under said body lowering control mode at the standstill of the vehicle; and fifth means for suppressing the first means from producing the body lowering control mode when receiving the jack-up representing signal.

BRIEF DESCRIPTION OF THE DRAWINGS

Other objects and advantages of the present invention will become apparent from the following description when taken in conjunction with the accompanying drawings, in which.

DETAILED DESCRIPTION OF THE PREFERRED EMBODIMENTS

Figure 1:
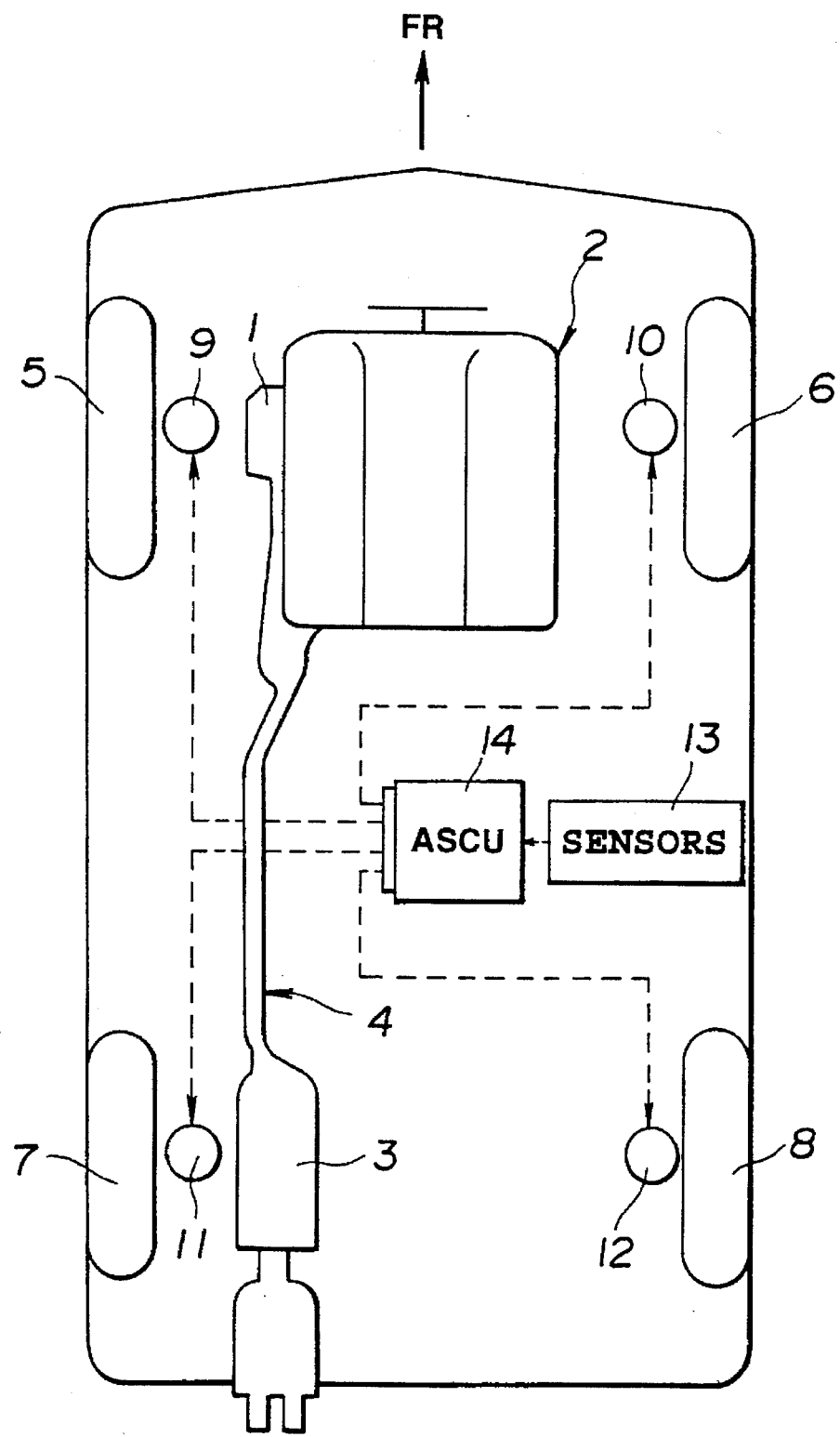
FIG. 1 is a schematic illustration of a FR (viz., front engine rear drive) motor vehicle to which an automatic level controller of the present invention is practically applied.

Referring to FIG. 1 of the drawings, there is schematically shown a FR (viz., front engine rear drive) motor vehicle to which an automatic level controller of the present invention is practically applied.

As will become apparent as the description proceeds, the level controller is so designed that the respective heights of the front-left and front-right portions of the vehicle body are independently controlled, but the respective heights of the rear-left and rear-right portions of the vehicle body are controlled in the same way.

As shown, the vehicle has front-left and front-right steered wheels 5 and 6 and rear-left and rear-right non-steered wheels 7 and 8. As will become clear hereinafter, each wheel 5, 6, 7 or 8 is equipped with a pneumatic height adjuster 9, 10, 11 or 12 for maintaining the vehicle at a predetermined height regardless of load.

Internal. combustion engine 2 is mounted on a front part of the vehicle. An exhaust system 4 extends from the engine 2 toward a rear end of the vehicle.

Figure 2:
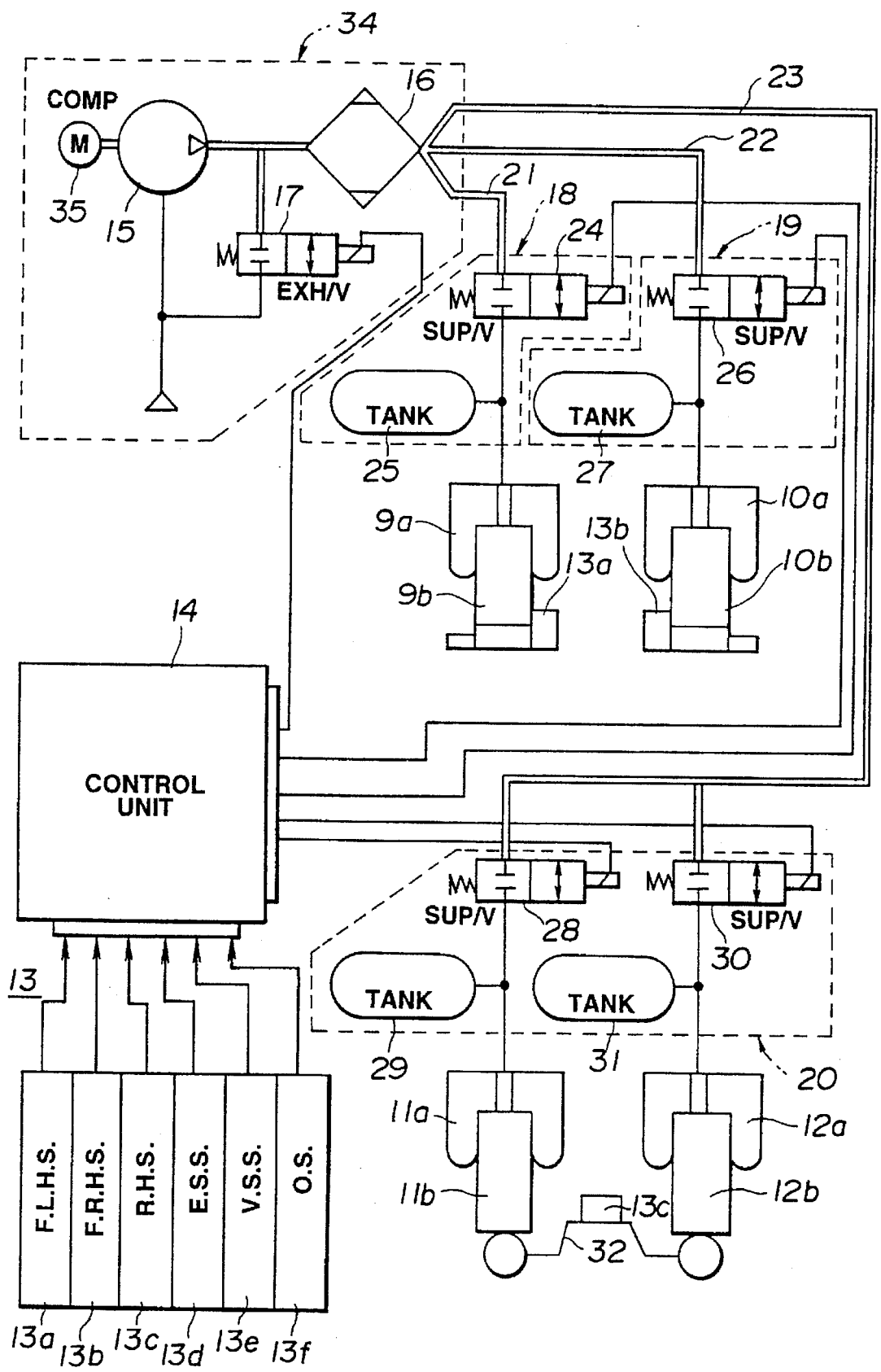
FIG. 2 is a schematic illustration of the automatic level controller of the invention.

As is seen from FIG. 2, the height adjusters 9 and 10 for the front wheels 5 and 6 are of a strut type, while the height adjusters 11 and 12 for the rear wheels 7 and 8 are of a shock absorber type. Each height adjuster 9, 10, 11 or 12 generally comprises an air chamber part 9a, 10a, 11a or 12a filled with compressed air and a shock absorber part 9b, 10b, 11b or 12b.

The height adjusters 9, 10, 11 and 12 are controlled by instruction signals issued from a control unit 14. The control unit 14 receives information signals from various sensors 13a, 13b, 13c, 13d, 13e and 13f, which are two vehicle height sensors 13a and 13b incorporated with the front-left and front-right wheels 5 and 6, a vehicle height sensor 13c incorporated with the rear wheels 7 and 8, an engine speed sensor 13d, a vehicle speed sensor 13e and other sensors 13f. More specifically, the height sensors 13a and 13b are mounted to respective suspension members of the front-left and front-right wheels 5 and 6, and the height sensor 13c is mounted to a rear stabilizer of the vehicle. The other sensors 13f include a steering angle sensor, a level mode setting switch, a brake sensing switch and so on.

The amount of compressed air (or air pressure) in each air chamber part 9a, 10a, 11a or 12a is controlled by an air control circuit which, as is seen from FIG. 2, has a compressed air source part 34. This air source part 34 comprises an air compressor 15 for producing a compressed air, an electric motor 35 for driving the air compressor 15, an air dryer 16 for eliminating humidity in the compressed air, and an air discharging valve 17 for discharging the air from the circuit upon demand of vehicle lowering. The air dryer 16 is connected through respective pipes 21, 22 and 23 to a front-left air circuit 18, a front-right air circuit 19 and a rear air circuit 20. Each of the front-left and front-right air circuits 18 and 19 comprises a sub-tank 25 or 27 and a suspension valve 24 or 26 which is selectively opened and closed for adjusting the height of the front portion of the vehicle. The rear air circuit 20 comprises two sub-tanks 29 and 31 and two suspension valves 28 and 30 each being selectively opened and closed for adjusting the height of the rear portion of the vehicle.

In normal operation, by analyzing the information signals from the sensors 13a to 13f, the control unit 14 issues instruction signals to the valves 17, 24, 26, 28 and 30. With this, the vehicle can be maintained at a given height in accordance with a position selected by the level mode setting switch.

In addition to such normal operation, the present invention can provide an advantageous operation which will become apparent as the description proceeds.

Figure 3:
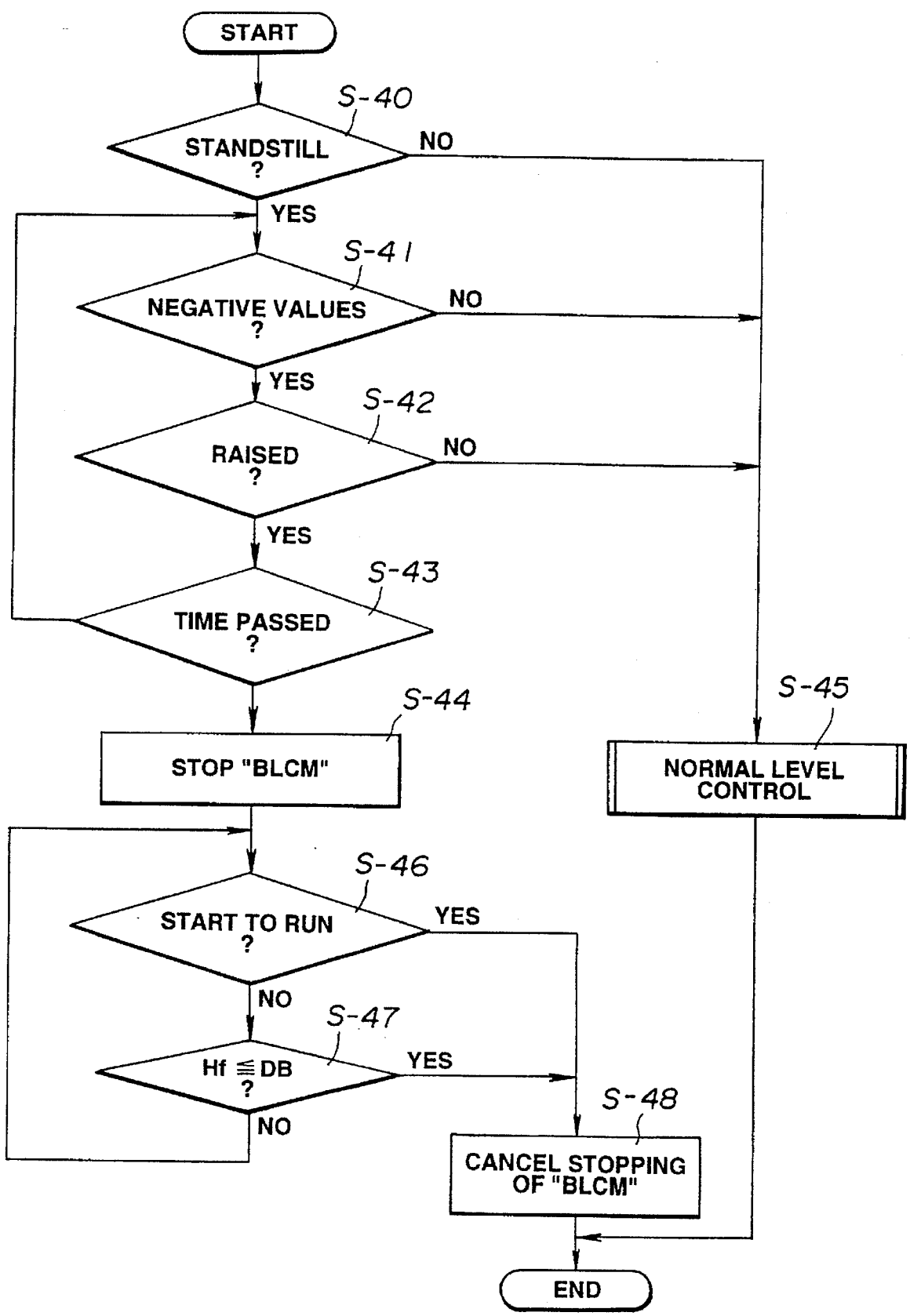
FIG. 3 is a flowchart showing programmed operation steps carried out in a control unit of the automatic level controller of the invention.

FIG. 3 is a flowchart for showing programmed operation steps carried out in the control unit 14 for the advantageous operation.

That is, at step S-40, a-judgment is carried out as to whether the motor vehicle is at a standstill or not. This judgment may be achieved by monitoring the vehicle speed and/or the brake operation. If YES, that is, when the vehicle is at a standstill, the operation flow goes to step S-41. At this step, a judgment is carried out as to whether or not the instruction signals from the control unit 14 to the three valves 17, 24 and 26 (or the other three valves 17, 28 and 30) have negative values, that is, whether or not the instruction signals are intended to open the valves 17, 24 and 26. If YES, that is, when the instruction signals have negative values, the operation flow goes to step S-42. At this step, a judgment is carried out as to whether a front portion or rear portion) of the vehicle, which has the height adjusting valves 24 and 26 (or 28 and 30) to which the instruction signals of negative value are being applied, is raised or not. This judgment may be carried out by monitoring differentiated values of the information signals from the vehicle height sensors 13a and 13b (or 13c). If YES, that is, when the front portion (or rear portion) of the vehicle body is judged to be raised, the operation flow goes to step S-43. At this step, a judgement is carried out as to whether a given time Ts (for example, 2 seconds) sufficient for carrying out the steps S-41 and S-42 has passed or not. If YES, that is, when the given time has passed, the operation flow goes to step S-44. If NO, the operation flow goes back to step S-41.

At step S-44, an instruction signal (viz., lowering control mode inhibiting signal) is issued from the control unit 14 for closing the three valves 17, 24 and 26 (or the three valves 17, 28 and 30) which have been kept open. Thus, thereafter, the air pressure in the air chamber parts 9a and 10a (or 11a and 12a) of the front wheel height adjusters 9 and 10 (or the rear wheel height adjusters 11 and 12) is kept unchanged. Then, the operation flow goes to step S-46.

If NO at steps S-40, S-41 or S-42, that is, when the motor vehicle is running, the instruction signals have positive values or the front portion (or rear portion) of the vehicle body is not raised, the operation flow goes to step S-45. At this step, a normal level controlling is carried out by the level controller.

After step S-44, the operation flow goes to step S-46. At this step, a judgment carried out as to whether the motor vehicle starts to run or not. If NO, that is, when the vehicle does not start to run, the operation flow goes to step S-47. At this step, a judgment is carried out as to whether or not a vehicle height "Hf" (see FIG. 4) sensed by the front wheel associated height sensors 13a and 13b (or vehicle height "Hr" sensed by the rear wheel associated height sensor 13c) is smaller than or equal to a predetermined reference height "DB". Actually, the vehicle height "Hf" is the distance from the center of the road wheel 5 or 6 (or, 7 or 8) to a fixed portion of the vehicle body. If YES at step S-47, that is, when the vehicle height "Hf" (or "Hr") is smaller than or equal to the predetermined reference height "DB", the operation flow goes to step S-48. If NO at step S-47, that is, when the vehicle height "Hf" (or "Hr") is greater than the predetermined reference height "DB", the operation flow goes back to step S-46. If YES at step S-46, that is, when the motor vehicle is at a standstill, the operation flow goes to step S-48.

At step S-48, the control unit 14 stops issuance of the lowering control mode inhibiting signal.

Thus, thereafter, the level controller is returned to its normal level controlling state by undergoing the step S-45 through the step S-40, S-41 or S-42. The normal level controlling state includes a body lowering mode wherein the vehicle body is being lowered and a body raising mode wherein the vehicle body being raised, which modes are selectively executed in accordance with the instruction from the control unit 14.

In the following, operation of the automatic level controller of the present invention will be described more concretely with reference to the flowchart of FIG. 3.

In case wherein no jack-up is carried out When the vehicle is running, there is no need of jacking up the vehicle of course. This is assured by the operation step S-40 of the flowchart. While, when the vehicle is standing with one road wheel (or two wheels) put on a raised portion (such as a curbstone or the like) or put in a recess formed in a road causing a certain inclination of the vehicle body, one of the operation steps S-41 and S-42 is forced to issue NO signal. That is, in such case, one of two combinations is inevitably selected, one being a combination wherein the instruction signals to the three valves 17, 24 and 26 (or 17, 28 and 30) have positive values (NO at step S-41) and the vehicle body is raised (YES at step S-42), and other being a combination wherein the instruction signals to the three valves 17, 24 and 26 (or 17, 28 and 30) have negative values (YES at step S-41) and the vehicle body is not raised (NO at step S-42). Thus, in such case, the level controller carries out the normal leveling operation.

Under the normal leveling operation, the height detected by each of the vehicle height sensors 13a, 13b and 13c is compared with the predetermined reference height "DB" which has been set by the level mode setting switch, and the level controlling is so made that the detected height becomes matched with the reference height "DB".

In case wherein one front wheel is jacked up

Figure 4:
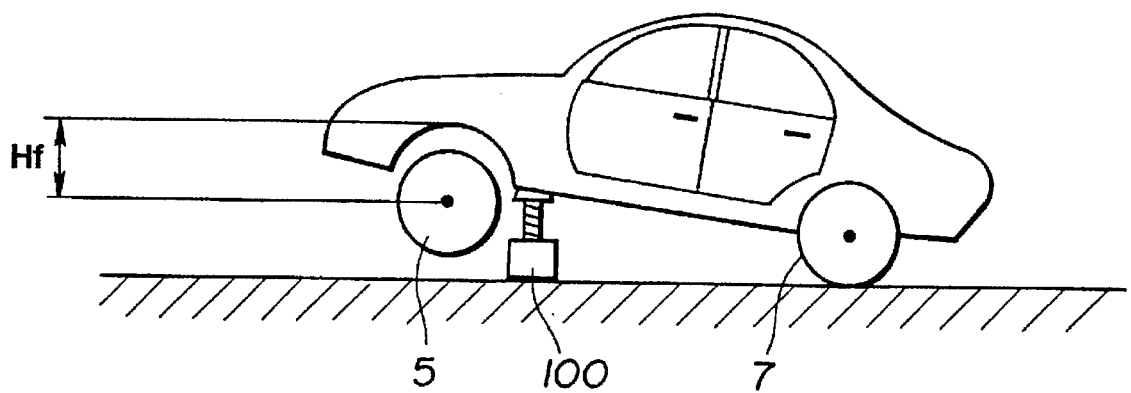
FIG. 4 is a side view of the motor vehicle under a condition wherein a front portion thereof is jacked up.

When, for example, a front portion of the vehicle is being jacked up by a jack-up device 100 as shown in FIG. 4, the front wheels 5 and 6 are gradually released from the load applied thereto from the road surface and thus a vertically supporting spring of the suspension of each front wheel 5 or 6 is stretched gradually. During this, each vehicle height sensor 13a or 13b is forced to issue an information signal representing that the vehicle height "Hf" gradually increases and finally exceeds the reference height "DB". When the sensed height "Hf" exceeds the reference height "DB", the control unit 14 issues instruction signals of negative values to the valves 17, 24 and 26 to open the same. With this, the body lowering control mode is created having the compressed air in the air chamber parts 9a and 9b being discharged therefrom. Thus, it will be appreciated that under such jacked up state of the vehicle, a contradictory condition takes place wherein, irrespective of the body lowering control mode actually created by the level controller, the front portion of the vehicle is kept raised due to the negative information signals from the height sensors 13a and 13b.

As is seen from the flowchart of FIG. 3, these operation steps travel on YES courses of the steps S-40, S-41 and S-42.

However, when the contradictory condition is kept for the given time Ts (step S-43), for example, 2 seconds, the body lowering control mode is instantly stopped (step S-44).

It is to be noted that this instant stop of the body lowering control mode ensures that a sufficient amount of the compressed air is still left in the air chambers 9a and 10a. Thus, the lowering in vehicle height caused by the body lowering control mode can be restricted to a small level. Accordingly, even when thereafter the jack-up device 100 is handled to lower the vehicle body onto the road surface, it never occurs that the vehicle stands with its body remarkably and thus inelegantly lowered. In other words, undesired bumping of the vehicle body bottom against the road surface at the jack-down handling can be avoided.

If the body lowering control mode is kept without being stopped like in case of the aforementioned prior art, the compressed air is fully discharged from the air chambers 9a and 10a and thus the lowering in vehicle height caused by the body lowering control mode becomes great. When, in this case, the jack-down handling is carried out, it tends to occur that the vehicle body bottom abuts against the road surface.

Although the above description is directed to the jack up of the front portion of the vehicle, a similar advantageous operation is obtained when a rear portion of the vehicle is jacked up.

Due to provision of the operation step S-43 wherein the given time (for example, 2 seconds) is measured before taking a subsequent operation, mis-judgement on the jack-up is avoided. That is, if such time-consuming step is not provided, a jack-up judgement may erroneously take place when the vehicle body is lifted temporarily by manual labor or the like.

The stoppage of the body lowering control mode is canceled (step S-48) when the vehicle, which has been lowered onto the road surface, starts to move (step S-46) or when the vehicle, which has been lowered onto the road surface, has the vehicle height "Hf" smaller than the reference height "DB" (step S-47).

After cancellation of the body lowering control mode, the level controller restarts its normal level controlling.

In the following, advantageous features of the present invention will be described.

(1) When the front (or rear) portion of the vehicle body is raised irrespective of the body lowering control mode being created and when this jack-up condition is kept for a given time "Ts", the body lowering control mode is instantly stopped judging that the vehicle body has been jacked up. Thus, the level controller of the present invention can avoid a marked lowering of the vehicle body at the jack-down handling regardless of the degree of the vehicle body rising which the jack-up handling has caused.

(2) When, under the stoppage of the body lowering control mode, the vehicle which has been lowered onto the road surface starts to run or has its height "Hf", smaller than the reference height "DB", the body lowering control mode is restarted. That is, after the jack-down handling, the normal automatic level controlling is instantly restarted.

(3) For judging whether the level controller is under the body lowering control mode or not to find a pre-condition for judging the jack-up condition, the instruction signals of negative or positive values issued from the control unit 14 are used. Considering the easiness with which the judgement of negative value or positive value can be made, the judgement as to the body lowering control mode is easily achieved.

In the following, modifications of the present invention will be described.

Although the above description is directed to the motor vehicle which has the front-left and front-right portions of the vehicle body independently controlled in height and the rear-left and rear-right portions of the vehicle body controlled in height in the same way, the present invention is also applicable to motor vehicles of a type which has all front-left, front-right, rear-left and rear-right portions independently controlled in height.

Although the above description is directed to the vehicle whose height adjusting is achieved by using the pneumatic height adjusters 9, 10, 11 and 12, the present invention can be applied to vehicles of a type which has hydraulic height adjusters.

Although, in the above-mentioned embodiment, the judgement as to whether the level controller is under the body lowering control mode or not is made from the judgement as to whether the instruction signals from the control unit have negative values or positive values, the judgment can be made from the fluctuation of air pressure in the air chambers of the pneumatic height adjusters 9, 10, 11 and 12.

What is claimed is:

1. An automatic level controller of a motor vehicle, comprising:

height adjusters each being operatively interposed between a road wheel and a vehicle body, each height adjuster having a work fluid chamber communicated with a compressed fluid source;

first means for controlling the pressure in said work fluid chamber of each height adjuster in accordance with an instructor signal applied thereto, said first means being capable of producing both a body lowering control mode wherein the vehicle body is being lowered and a body raising control mode wherein the vehicle body is being raised;

second means for detecting the height of a portion of the vehicle body which is to be adjusted in height by selected one of said height adjusters;

third means for detecting a standstill of the vehicle;

fourth means for determining lapse of a predetermined period of time that the height of said portion detected by said second means is kept increased, and thereafter issuing a jack-up representing signal when under said body lowering control mode at the standstill of the vehicle; and fifth means for suppressing said first means from producing said body lowering control mode when receiving said jack-up representing signal.

2. The automatic level controller according to claim 1, wherein:

each of said body lowering control mode and said body raising control mode is a mode to adjust the height of said portion of the vehicle body to a predetermined reference height.

3. The automatic level controller according to claim 2, further comprising:

sixth means for issuing a first canceling signal when, under suppression of said first means from producing said body lowering control mode, the vehicle starts to run;

seventh means for issuing a second canceling signal when, under suppression of said first means from producing said body lowering mode, the height of said portion detected by said second means becomes smaller than said predetermined reference height; and eighth means for permitting said first means to operate in a normal manner to produce both said body lowering and raising control modes when receiving one of said first and second canceling signals.

4. The automatic level controller according to claim 2, wherein:

the judgment as to whether the body lowering control mode is kept or not is carried out based on a judgment as to whether instruction signals applied to the selected height adjuster have negative or positive values.

5. The automatic level controller according to claim 2, wherein:

each of said height adjusters is of a pneumatic type which comprises an air chamber part and a shock absorber part.

6. The automatic level controller according to claim 2, wherein:

said predetermined period of time determined by said fourth means is about 2 seconds.

* * * * *